March 11, 1952 H. KLOUMAN ET AL 2,589,093
COILING REEL FOR STECKEL MILLS
Filed March 23, 1950 2 SHEETS—SHEET 1
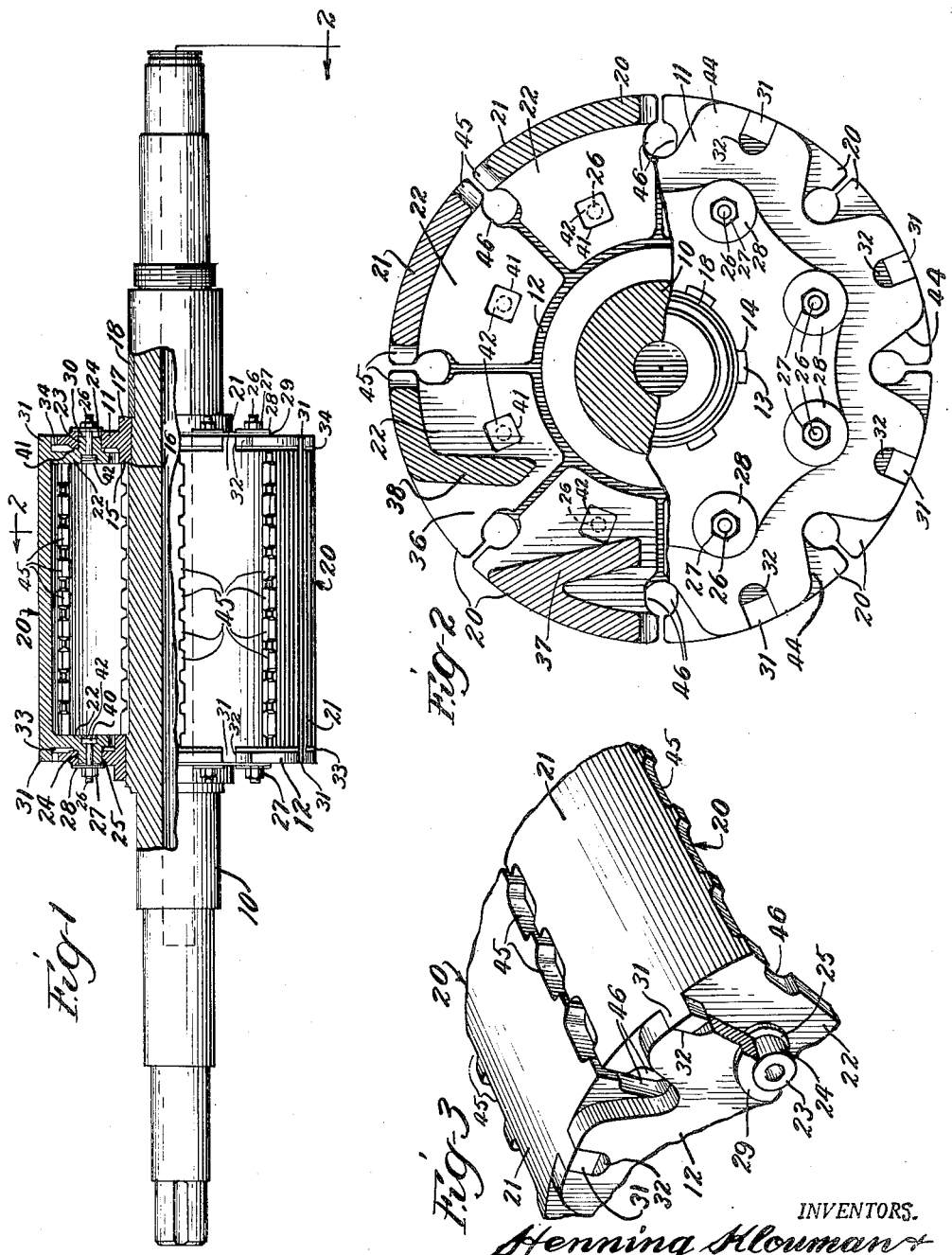
INVENTORS.
Henning Klouman
Carl Nygren
By:- Mann and Brown

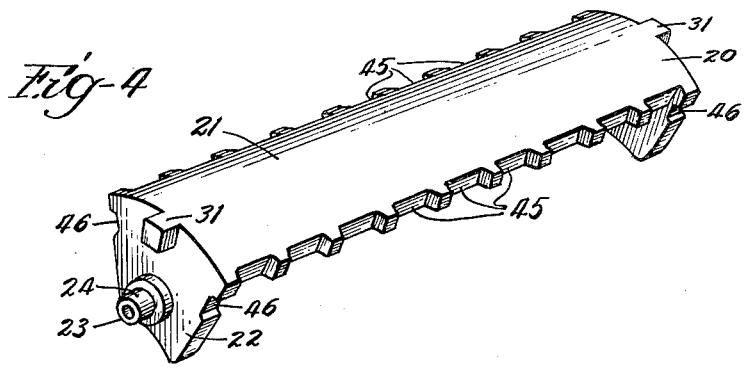
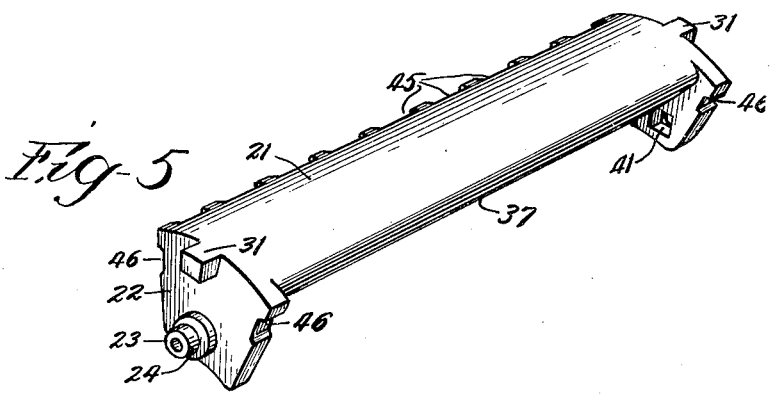
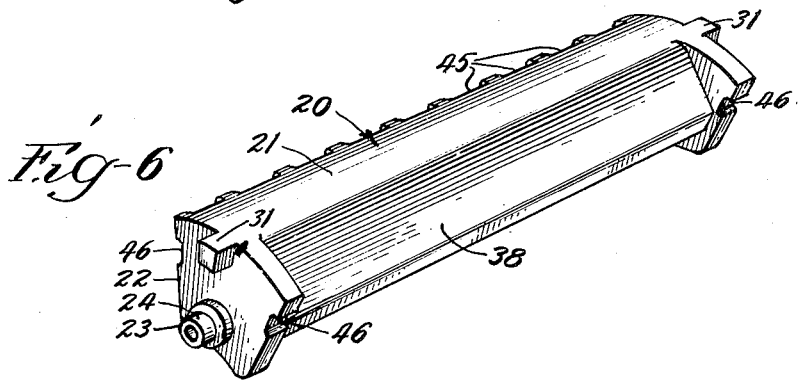

Patented Mar. 11, 1952

2,589,093

UNITED STATES PATENT OFFICE 2,589,093

COILING REEL FOR STECKEL MILLS

Henning Klouman and Carl Nygren, Michigan City, Ind., assignors to Michiana Products Corporation, a corporation of Indiana Application March 23, 1950, Serial No. 151,334

8 Claims. (Cl. 242—78)

This invention relates to coiling reels for Steckel mills, such as disclosed in Steckel Patent No. 1,977,214, October 6, 1934, and has for its principal object to provide an improved arrangement whereby the peripheral parts on which the strips are wound are securely made fast against movement under centrifugal force and inward pressure while being free to expand and contract under heating and cooling.

Generally speaking, this is accomplished by making the reels of spaced disks with bars or rim sections extending between them to form the periphery of the reel and made fast to the disks at points well inward from the periphery and equidistant from the axis of rotation, but otherwise free to expand and contract independently.

Further objects and advantages of the invention will appear as the disclosure proceeds and the description is read in connection with the accompanying drawings, in which:

Fig. 1 is a front elevation of a reel and the water-cooled shaft on which it is mounted;

Fig. 2 is a vertical section on the line 2—2 of Fig. 1, with parts being shown in end elevation;

Fig. 3 is a perspective view of fragments of a disk and two rim portions of a reel; and Figs. 4, 5, and 6 are perspective views of rim portions of a reel.

Reels embodying this invention correspond to reels 71 shown in a Steckel patent, and are mounted in heated chambers corresponding to those shown at 70 on shafts corresponding to those shown at 72 in that patent.

In Figs. 1 and 2, 10 indicates a water-cooled shaft adapted to be mounted on suitable bearings and to extend through the walls of the heated chamber.

Each reel includes two disks 11 and 12 mounted on the shaft 10 and driven thereby through keys 13 fitted in keyways 14 (Fig. 2).

The disk 11 is fixed with respect to the shaft 10 by having the inner end 15 of its hub portion rest against a shoulder 16 on the shaft and the outer end 17 held by a sleeve 18 which extends to the outside of the furnace and is there secured by an adjusting nut and a lock nut.

The disk 12 is free on the shaft except for keys 13 fitted in the keyways 14, and may move lengthwise to the shaft in allowing for expansion and contraction on heating and cooling.

The rim portion of each reel between the disks 11 and 12 is made up of a plurality of peripheral bars or rim sections 20 in circular series about the axis of the shaft 10, and presenting curved surfaces 21 substantially making up a circumference or peripheral surface on which the strip is wound.

The bars 20 are made fast to the disk at points equidistant from the axis of the shaft 10 and as close to that shaft as practicable, taking into consideration the fact that the water-cooled shaft is necessarily of considerable diameter and the hub portions of the disks must fit on the outside of it.

In this preferred embodiment, each end of each peripheral bar 20 is offset inwardly, so to speak, by providing it with a radial arm or end portion 22 bearing at its free end a hollow trunnion 23 having a finished portion 24 adapted to be received in an opening 25 in the corresponding disk 11 or 12. Each such trunnion is made fast to the corresponding disk by a bolt 26 equipped with a nut 27 run up against a resilient washer 28 resting against a boss 29 on the outside of the disk and clearing the end of the trunnion as at 30 a sufficient amount to leave room for expansion.

Each peripheral bar 20 is held against rotation about its trunnions by lugs 31 projecting from the ends thereof and received in slots 32 in the disks. As appears most clearly in Fig. 1, there are clearance spaces 33 and 34 between the rim sections and the disks 11 and 12.

The clearance between the sides of the lugs 31 and the walls of the slots 32 is quite close, on the order of .002".

In order to provide an entrance slot 36 to receive the leading end of a strip to be wound on the reel, the adjacent peripheral bar at one side is provided with an inturned flange 37, and the adjacent bar 20 on the opposite side is provided with a flange 38 at a slight angle to the flange 37. As shown, the flange 37 is at approximately 53 degrees to a radius, and the flange 38 is at approximately 34 degrees to a radius of the reel.

For convenience, the bar at the right of the slot 36 will be called the entering bar, and the one at the left will be called the driving bar.

From an examination of Figs. 1 and 2, it will be seen that the construction affords a clear path for the entering end of the strip through the slot 36 without chance of interference with any part of the reel.

As insurance against the end of the strip catching, the heads 40 of the bolts 26 are countersunk at 41; and thin, heat-resistant alloy plates 42 are welded into the countersunk recesses to cover the heads of the bolts smoothly.

The principal strain of the strip wound on the reel is against the driving bar at the left of the slot 36 in Fig. 2, and that is amply provided for by the direction of the flange 37.

In one design that has been found satisfactory for a reel 48" in diameter, the trunnions, 3.998" outside diameter, are made fast to the disks on a circle 30" in diameter with clearance on the order of .002".

It has also been found of considerable advantage to scallop the peripheries of the disks, as indicated at 44, in staggered relation to the notches 32 and the openings 25. The shaft 10 being relatively large and watercooled, there is quite a difference in the expansion of the inner portions of the disks and that of the outer portions. The scallops serve to relieve what would otherwise amount to considerable strain in the peripheral portions of the disks. The scallops may extend inward to the end of 37" radii.

It is also of advantage in some instances to provide for free atmospheric communication between the interior of the reel and the furnace exterior to the reel. That is accomplished in the present instance by providing the bars 29 with spaced notches 45 about 1½" wide along their opposite edges and the arms 22 with like notches 46 adjacent to the bars 29. These slots provide ample freedom of movement of air within the furnace into and out of the reel.

This application is a continuation in part of applicant's copending application Ser. No. 111,236, filed August 19, 1949, now abandoned.

We claim:

1. A coiling reel including a pair of disks spaced axially and each having an annular series of openings, an annular series of peripheral bars extending between the disks and each having an inwardly offset stud at each end received in an opening in one of the disks, means to make the studs fast to the disks, and a driving connection between each end of each bar and the adjacent disk radially outwardly with respect to the associated stud.

2. A coiling reel including a pair of disks spaced axially and having an annular series of openings and an annular series of slots radially outwardly with respect to the openings, an annular series of bars extending between the disks, each having at each end a stud fast in one of the openings of the adjacent disk, and a lug received in the corresponding slot on the adjacent disk.

3. A coiling reel including a pair of disks spaced axially and each having an annular series of openings, an annular series of bars extending between the disks, each having a hollow countersunk stud at each end received in an opening in one of the disks, a bolt fastening each hollow countersunk stud to the corresponding disk, and means fixing said bars radially outwardly of said studs to said disks against rotation relative thereto.

4. A coiling reel including a pair of disks spaced axially and each having an annular series of openings, an annular series of peripheral bars extending between the disks and each having a stud at each end received in an opening in one of the disks, means to make the studs fast to the disks, and a driving connection between each end of each bar and the adjacent disk, the adjacent edges of two adjacent bars having spaced parallel flanges to receive a strip to be wound on the reel.

5. A coiling reel including a pair of disks spaced axially and having an annular series of openings and peripheral scallops staggered with respect to the openings, an annular series of bars extending between the disks, each having at each end a stud fast in one of the openings of the adjacent disk, and a driving connection between each end of each bar and the adjacent disk spaced radially outwardly with respect to the stud.

6. A coiling reel including a pair of disks spaced axially and each having an annular series of openings, an annular series of peripheral bars extending between the disks and each having a stud at each end received in an opening in one of the disks, means to make the studs fast to the disks, and a driving connection between each end of each bar and the adjacent disk spaced radially outwardly with respect to said studs, said bars provided with notched adjacent edges.

7. A coiling reel including a pair of axially spaced disks each having an annular series of openings spaced radially inwardly from the peripheries of the disks, an annular series of peripheral bars extending between said disks, each bar having a body formed arcuate in cross section and the bodies of said bars being concentric, the ends of each bar body having radially inwardly extending arms, and means connecting the radially inner end of each arm in one of said openings, each end of each body and the associated disk comprising a pair of parts one of which is provided with a radial slot and the other of which is provided with a lug engaging in the slot to provide a driving connection between said two parts.

8. A coiling reel including a pair of axially spaced disks each having an annular series of openings spaced radially inwardly from the peripheries of the disks, an annular series of peripheral bars extending between said disks, each bar having a body formed arcuate in cross section and the bodies of said bars being concentric, the ends of each bar body having radially inwardly extending arms, a stud carried by each arm and projecting through one of said openings, and means for fixing each stud in its associated opening, each end of each body and the associated disk comprising a pair of parts one of which is provided with a radial slot and the other of which is provided with a lug engaging in the slot to provide a driving connection between said two parts.

HENNING KLOUMAN.
CARL NYGREN.

REFERENCES CITED

The following references are of record in the file of this patent:

UNITED STATES PATENTS

| Number | Name | Date |
|---|---|---|
| 8,617 | Tucker | Dec. 23, 1851 |
| 2,116,121 | Montgomery | May 3, 1938 |
| 2,219,150 | Montgomery | Oct. 22, 1940 |
| 2,264,872 | Bryn | Dec. 2, 1941 |
| 2,479,809 | Bohlin | Aug. 23, 1949 |